(12) United States Patent
Nishida

(10) Patent No.: US 6,365,083 B1
(45) Date of Patent: Apr. 2, 2002

(54) METHOD OF FORMING MOLDED PRODUCT FROM THREE OR MORE SEMI-MOLDED PRODUCTS AND MOLD ASSEMBLY THEREFOR

(75) Inventor: Shoso Nishida, Hiroshima (JP)

(73) Assignee: The Japan Steel Works, Ltd., Tokyo (JP)

( * ) Notice: Subject to any disclaimer, the term of this patent is extended or adjusted under 35 U.S.C. 154(b) by 0 days.

(21) Appl. No.: 09/443,194

(22) Filed: Nov. 19, 1999

(30) Foreign Application Priority Data

Nov. 20, 1998 (JP) .......................... 10-346659

(51) Int. Cl.⁷ .................. B29C 33/34; B29C 45/04; B29C 45/10; B29C 45/14
(52) U.S. Cl. .................. 264/255; 264/261; 264/263; 264/267; 264/297.2; 264/297.8; 425/129.1; 425/134; 425/575
(58) Field of Search ................. 264/250, 255, 264/261, 263, 267, 274, 297.2, 297.8; 425/129.1, 574, 575, 134, 572, 573, 588, 120, 123, 125

(56) References Cited

U.S. PATENT DOCUMENTS

| | | | | |
|---|---|---|---|---|
| 3,287,485 A | * | 11/1966 | McCord | |
| 4,155,478 A | * | 5/1979 | Ogi | 264/263 |
| 4,261,947 A | * | 4/1981 | Ogi | 264/263 |
| 5,116,557 A | * | 5/1992 | Debaes et al. | 264/255 |
| 6,042,364 A | * | 3/2000 | Nishida | 264/255 |
| 6,210,619 B1 | * | 4/2001 | Owens | 264/255 |

* cited by examiner

Primary Examiner—Angela Ortiz
(74) Attorney, Agent, or Firm—Sughrue Mion, PLLC

(57) ABSTRACT

A plurality of semi-molded products (H, J, K) are formed in a slide mold (20) and slide cores (30, 30') simultaneously in the step of primary molding. Then, the slide cores (30, 30') are opened in the condition that the semi-molded products (H, J, K) remain in the slide mold (20) and the slide cores (30, 30') respectively. Then, the slide mold (20) and the slide cores (30, 30') are slid so that the semi-molded products (H, J, K) are collected into a predetermined position. Then, a molten resin is injected into joint portions of the semi-molded products (H, J, K) collected and clamped, so that the plurality of semi-molded products (H, J, K) are integrated with one another in the slide mold (20) and the slide cores (30, 30') in the step of secondary molding to thereby obtain a molded product (S).

6 Claims, 5 Drawing Sheets

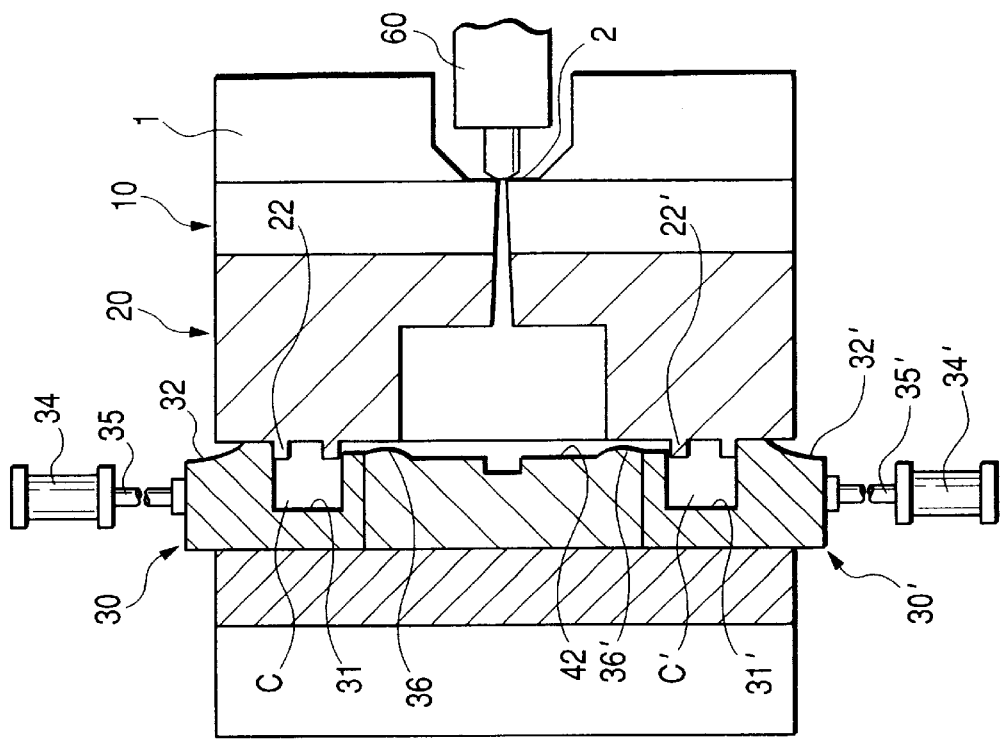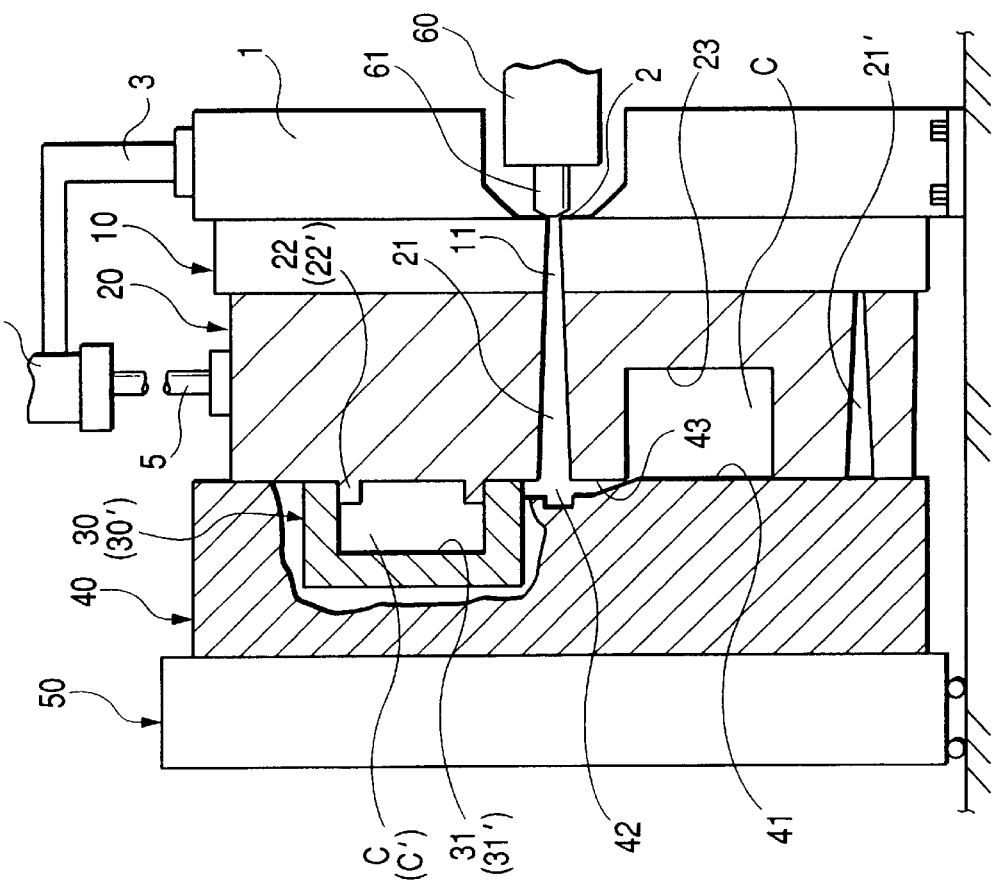

METHOD OF FORMING MOLDED PRODUCT FROM THREE OR MORE SEMI-MOLDED PRODUCTS AND MOLD ASSEMBLY THEREFOR

BACKGROUND OF INVENTION

1. Field of Invention

The present invention relates to a molding method of forming a molded product from three or more semi-molded products through steps of primary molding and secondary molding, and a die assembly used for carrying out the molding method.

2. Related Art

An injection molding method is commonly known in the background art. Stationary dies and movable dies are used for carrying out the molding method. Each of these dies is provided with a predetermined-shape cavity. Accordingly, if the movable dies are opened after cooling and solidification of a molten resin injected into the cavities in the condition that the movable dies are clamped with respect to the stationary dies, a predetermined-shape molded product can be obtained. Depending on the shape of the molded product, however, it is impossible to take the molded product out even if the movable dies are opened. Therefore, when the shape of the product is so complex that the product cannot be taken out, a plurality of semi-molded products are formed separately and then bonded to one another by a method such as a vibration fusion-bonding method, a hot-plate fusion-bonding method, or the like, other than the injection molding method so that a desired product is obtained. The aforementioned complex-shape product is produced also by a die-cast molding method, a lost core method, or the like.

Although the complex-shape product can be obtained surely as described above, the background-art production method has a disadvantage. When, for example, the number of steps increases, it is general that the percentage of rejected products increases and that the efficiency of production is lowered. According to the vibration fusion-bonding method, the hot-plate fusion-bonding method, or the like, the percentage of rejected products increases more greatly and the efficiency of production is lowered more greatly because there are required two different steps of an injection molding step for obtaining semi-molded products, and a bonding step for bonding the obtained semi-molded products to one another. Further, in the vibration fusion-bonding method, not only it is impossible to obtain any complex-shape product because vibration cannot be applied to the complex-shape semi-products but also there is a problem that the product is deformed because of vibration. Furthermore, there is a defect that the product lacks reliability because fusion-bonding characteristic varies. On the other hand, according to the die-cast molding method, the lost core method, or the like, it may be possible to obtain a high-reliable product but it is unavoidable that the cost of the product increases, for example, because an expensive lost material is required.

SUMMARY OF INVENTION

The present invention is proposed to solve the aforementioned problem. Specifically, an object of the present invention is to provide a method of forming a complex molded product from a plurality of portions inexpensively with high quality, and a die assembly used for carrying out the method.

In order to achieve the above object, according to a first aspect of the present invention, there is provided a method of forming a molded product from three or more semi-molded products, comprising the steps of: performing primary molding in which a plurality of semi-molded products are formed in a first mold simultaneously, then a second mold is opened in a condition that the semi-molded products remain in the first mold, and the first mold is moved to collect the semi-molded products into a predetermined position; and performing secondary molding in which a molten resin is injected into contact portions of the semi-molded products which are collected and clamped to come into contact with one another, so that the plurality of semi-molded products are integrated with one another in the first mold to thereby obtain a molded product.

According to a second aspect of the present invention, the first mold is constituted by a slide mold to be slid relative to a stationary mold and slide cores to be slid in a direction different from the sliding direction of the slide mold. According to a third aspect of the present invention, a molten resin different from the resin used at the time of primary molding is injected at the time of secondary molding.

According to a fourth aspect of the present invention, there is provided a mold assembly for forming a molded product from three or more semi-molded products, comprising a slide mold provided with a predetermined number of cavities, and slide cores each provided with a predetermined number of cavities, wherein: the slide cores is configured so as to be slidable in a direction different from the sliding direction of the slide mold; and the slide mold and the slide cores are configured so as to be slidable between a position where the cavities of the slide mold are located separately from the cavities of the slide cores on one hand and another position where the cavities of the slide mold are located so as to approach the cavities of the slide cores to match therewith on the other hand.

According to a fifth aspect of the present invention, the slide cores are constituted by a pair of slide cores which are configured so as to be slidable in a direction perpendicular to the sliding direction of the slide mold.

BRIEF DESCRIPTION OF DRAWINGS

FIGS. 1A and 1B are partly sectional views typically showing a state in which a mold assembly according to an embodiment of the present invention is closed in a position of primary molding.

FIG. 1A is a side view thereof, and

FIG. 1B is a plan view thereof.

FIG. 2A is a side view showing a state in which primary molding is terminated, and FIG. 2B is a plan view thereof.

FIG. 3A is a side view showing a state in which the mold assembly is opened and a slide mold and slide cores are slid to positions of secondary molding after completion of primary molding, and FIG. 3B is a plan view thereof.

FIG. 4A is a side view showing a state in which secondary molding is terminated, and FIG. 4B is a plan view thereof.

FIG. 6A is a side view thereof, and

FIG. 6B is a plan view thereof.

FIG. 7A is a perspective view of the molded product as a whole, and

FIG. 7B is a perspective view of semi-molded products.

DETAILED DESCRIPTION OF PREFERRED EMBODIMENTS

Figure 7A:
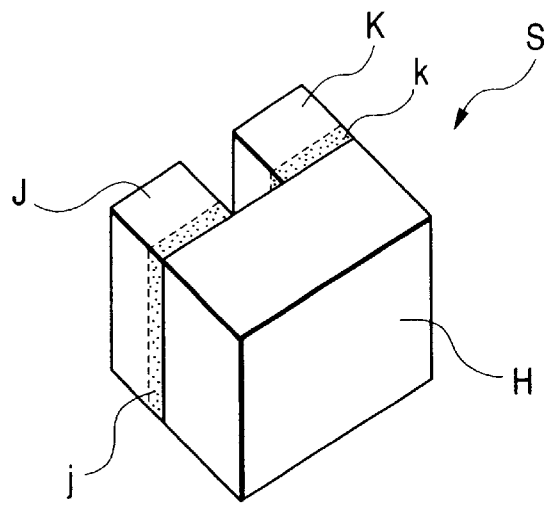
FIGS. 7A and 7B are perspective views showing an example of the molded product obtained according to the present invention.
Figure 7B:
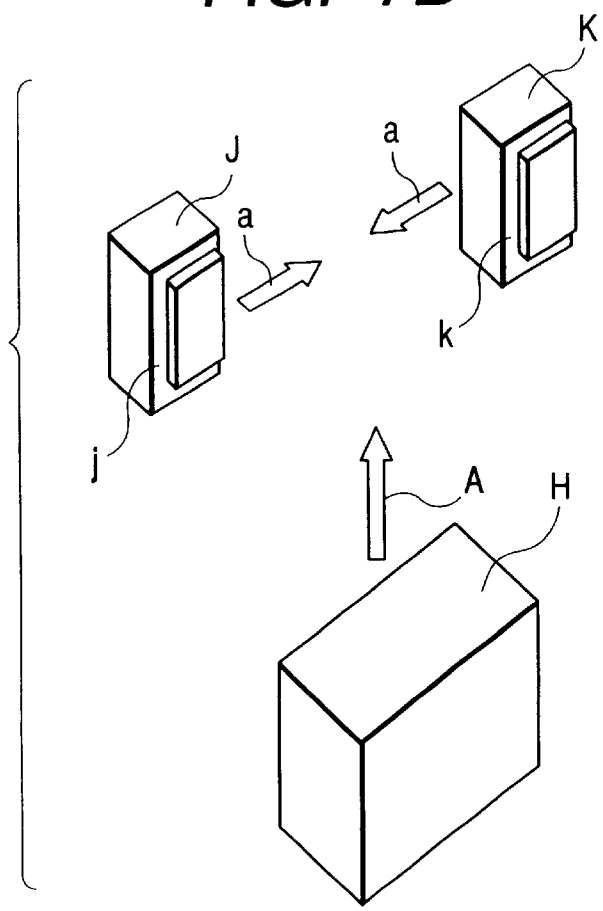

Although a complex-shape molded product can be obtained according to the present invention as will be described later, the case where such a simple molded product as shown in FIG. 7A is formed will be described to facilitate the description. That is, an example of formation of a molded product S composed of a first semi-molded product H substantially shaped like a rectangular parallelopiped, and second and third semi-molded products J and K each substantially shaped like a rectangular parallelopiped similarly to the first semi-product H and integrated with the first semi-molded product H as shown in FIG. 7A will be described. In this embodiment, as shown in FIG. 7B, the semi-molded products H, J and K are formed simultaneously in a mold assembly in the step of primary molding so that the second and third semi-molded products J and K are separated horizontally from each other whereas the first semi-molded product H is separated vertically from the second and third semi-molded products J and K. Then, the second and third semi-molded products J and K are moved horizontally as indicated by the arrows a, a so as to approach each other. On the other hand, the first semi-molded product H is moved up as indicated by the arrow A so as to approach the second and third semi-molded products J and K. Then, a molten resin is injected into contact portions of the semi-molded products in the mold assembly in the step of secondary molding. As a result, a molded product S in which the semi-molded products H, J and K are integrated with one another is obtained. Incidentally, in this embodiment, cut step portions j and k are formed in order to improve bonding strength in the circumferences of the second and third semi-molded products J and K respectively at the time of primary molding.

An embodiment of the mold assembly will be described first with reference to FIGS. 1A and 1B. FIG. 1A is a typical side view of the mold assembly. FIG. 1B is a typical plan view of the mold assembly. As shown in FIGS. 1A and 1B, the mold assembly in this embodiment is roughly constituted by a stationary platen 1, a movable platen 50 forming a counterpart to the stationary platen and provided so as to be able to be driven in a mold opening/closing direction, a stationary mold 10 attached to the stationary platen 1, a slide mold 20 provided so as to be able to slide relative to the stationary mold 10, a movable mold 40 driven in the mold opening/closing direction together with the movable platen 50, and a pair of slide cores 30 and 30' provided so as to be able to slide relative to the movable mold 40.

As is commonly known in the background art, the stationary platen 1 is fixed to an injection pedestal. A nozzle touch portion 2 is formed substantially in the center portion of the stationary mold 10 fixed to the stationary platen 1. A nozzle 61 of an injection unit 60 is located in the nozzle touch portion 2. A supporting arm 3 is attached to an upper end portion of the stationary platen 1. A piston cylinder unit 4 is supported by the supporting arm 3. As will be described later in detail, an end portion of a rod 5 of the piston cylinder unit 4 is connected to the slide mold 20. Accordingly, when a working fluid is supplied to or discharged from the piston cylinder unit 4, the slide mold 20 is driven to slide vertically in FIG. 1A.

A first sprue 21 opened to a parting line is formed substantially in the center portion of the slide mold 20 which is driven to slide vertically. A second sprue 21' opened to the parting line in the same manner as in the first sprue 21 is formed at a predetermined distance from the first sprue 21. The first sprue 21 is provided so that the first sprue 21 matches with a sprue 11 of the stationary mold 10 when the slide mold 20 is located in a position shown in FIG. 1A for primary molding. On the other hand, the second sprue 21' is provided so that the second sprue 21' matches with the sprue 11 of the stationary mold 10 when the slide mold 20 is slid upward for secondary molding.

A pair of cores 22 and 22', each of which is continued so as to be substantially shaped like a square, are provided in an upper portion of the slide mold 20 on the parting line side at a predetermined distance from the first sprue 21. By the pair of cores 22 and 22', cut step portions j and k are formed in the circumferences of the second and third semi-molded products J and K in the molded product S at the time of primary molding. Incidentally, the pair of cores 22 and 22' are shown more in detail in the plan view of FIG. 1B. A recess portion 23 opened to the parting line side is formed under the first sprue 21. A cavity C for forming the substantially rectangular parallelopiped first semi-molded product H of the molded product S is formed by the recess portion 23 in conjunction with a parting surface 41 of the movable mold 40.

An upper portion of the movable mold 40 in FIG. 1A is cut down so as to be opened to the parting line side. A pair of slide cores 30 and 30' are provided in the cut portions so as to be able to slide vertically in FIG. 1B, that is, in a direction perpendicular to the paper surface in FIG. 1A. In the embodiment shown in the drawings, the pair of slide cores 30 and 30' have the same structure. Accordingly, one slide core 30 will be mainly described hereafter. The same reference numeral accompanied by "'" is given to the other slide core 30' in the drawings to avoid the duplicated description. A recess portion 31 opened to the parting line is formed in the slide core 30. The recess portion 31 is provided so as to match with the core 22 of the slide mold 20. The core 22 is located in the inside of the recess portion 31 at the time of primary molding to thereby form a cavity c for forming the first semi-molded product J of the molded product S.

A piston cylinder unit 34 is provided for driving the slide core 30. An end portion of a rod 35 of the piston cylinder unit 34 is connected to the slide core 30. Accordingly, when a working fluid is supplied to or discharged from the piston cylinder unit 34, the slide core 30 is driven to slide vertically in FIG. 1B. Incidentally, an escape 32 for allowing the core 22 of the slide mold 20 to escape at the time of secondary molding is provided in a portion of the slide core 30 which faces the slide mold 20.

The movable mold 40 is attached to the movable platen 50 in a commonly known manner in the background art. When the slide core 30/30' with a built-in ejector unit is in a secondary molding position, that is, in a position where the molded product S is taken out, an ejector pin of the movable mold 40 matches with another ejector pin which is, for example, provided on the slide core 30/30' so as to be urged by a spring. As a result, the ejector pin provided on the slide core 30/30' is pressed against the spring.

A runner 42 is formed in a position of the movable mold 40 on the parting line side corresponding to the first sprue 21 of the slide mold 20. The runner 42 is selected to have a predetermined size. A lower end portion of the runner 42 communicates, through a gate 43, with the cavity C for forming the first semi-molded product H in the molded product S at the time of primary molding as shown in FIG. 1A. The gate 43 is closed by the parting line surface of the slide mold 20 at the time of secondary molding in which the slide mold 20 is driven to slide upward. On the other hand, as shown in FIG. 1B, the runner 42 which communicates with the sprue 21 is displaced laterally or horizontally in an upper portion of the mold so as to communicate, through gates 36 and 36', with cavities c and c' for forming the second and third semi-molded products J and K respectively in the same manner as described above. Since the runner 42 communicates with the cavity C through the gate 43 as described above, the cavities c, c' and C are filled with a molten resin simultaneously at the time of primary molding. Incidentally, the slide cores 30 and 30' are driven to approach each other at the time of secondary molding. Since the runner 42 is, however, selected to have a predetermined size, the communication state is kept also at the time of secondary molding after the slide cores 30 and 30' are slid.

Figure 2A:
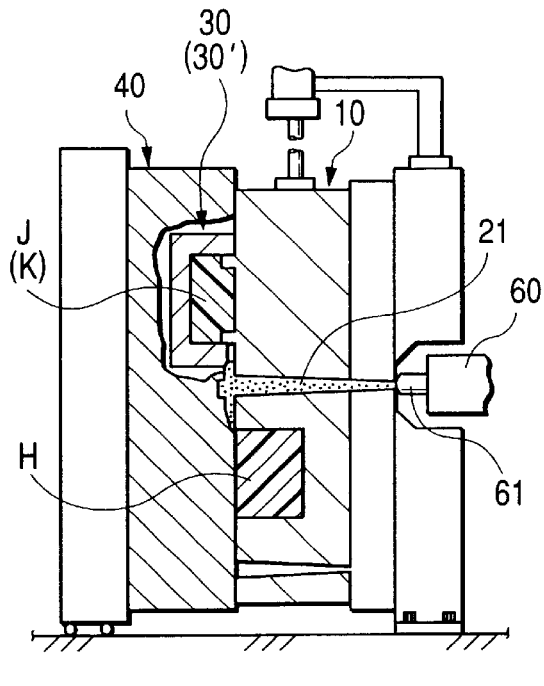
FIGS. 2A and 2B are partly sectional views typically showing a molding step according to the embodiment of the present invention in conjunction with the mold assembly.
Figure 2B:
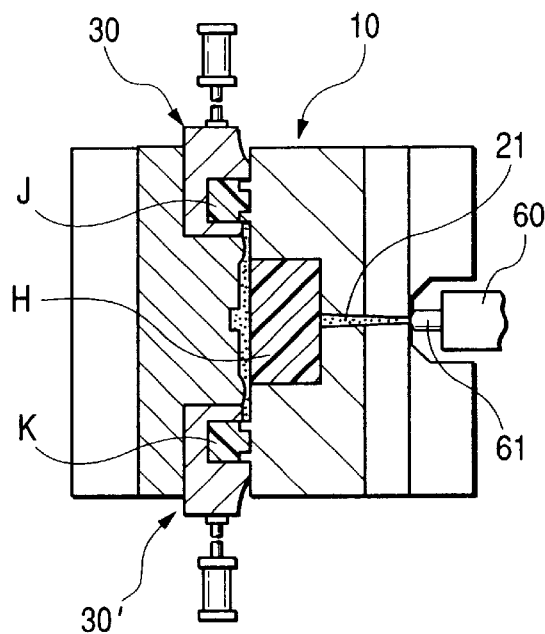

An example of formation using the aforementioned mold assembly will be described below. FIGS. 1A and 1B show a state in which the mold assembly is closed for primary molding. In this state, a molten resin is ejected from the nozzle 61 of the injection unit 60. The cavity C of the slide mold 20 is filled with the molten resin from the first sprue 21 of the slide mold 20 through the runner 42 and the gate 43 of the movable mold 40 and, at the same time, the cavities c and c' of the slide cores 30 and 30' are also filled with the molten resin through the gates 36 and 36' respectively. As a result, the first, second and third semi-molded products H, J and K shown in FIGS. 1A and 1B are formed. FIGS. 2A and 2B show a state in which the cavities are filled with the molten resin injected in the step of primary molding.

Figure 3A:
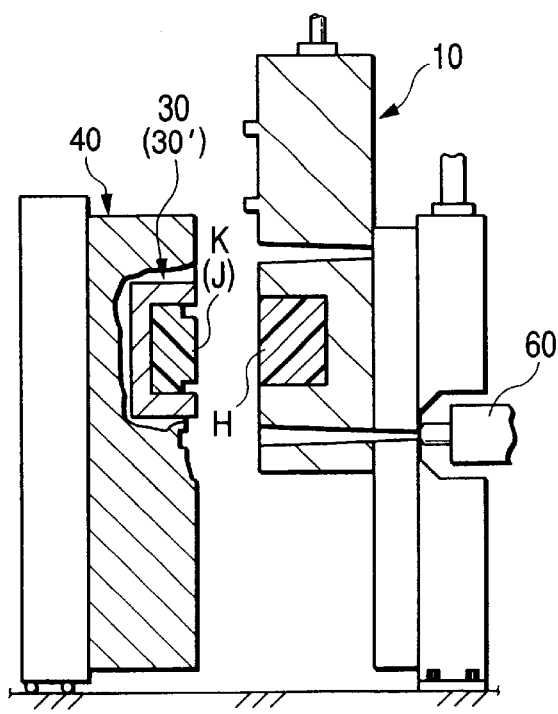
FIGS. 3A and 3B are partly sectional views typically showing a molding step according to the embodiment of the present invention in conjunction with the mold assembly.
Figure 3B:
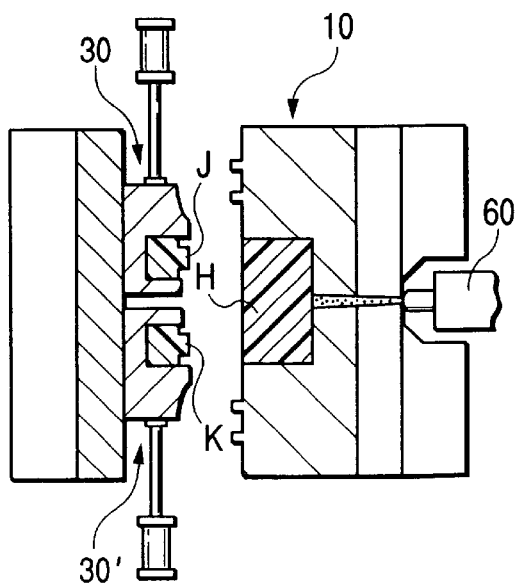

After the molten resin is solidified to a certain degree, the movable platen 50 is opened by a predetermined quantity so that the slide mold 20 and the slide cores 30 and 30' can be slid. As a result, the movable mold 40 and the slide cores 30 and 30' are separated from the slide mold 20. On this occasion, the first semi-molded product H in the molded product S remains in the slide mold 20 and the second and third semi-molded products J and K remain in the slide cores 30 and 30' respectively. The sprue drops out. Then, as shown in FIGS. 3A and 3B, the slide mold 20 is slid upward by a predetermined quantity. On the other hand, the slide cores 30 and 30' are also slid by a predetermined quantity so as to approach each other. As a result, the first, second and third semi-molded products H, J and K in the molded product S are collected so that the cavities C, c and c' match with one another, that is, the first, second and third semi-molded products H, J and K match with one another.

Figure 4A:
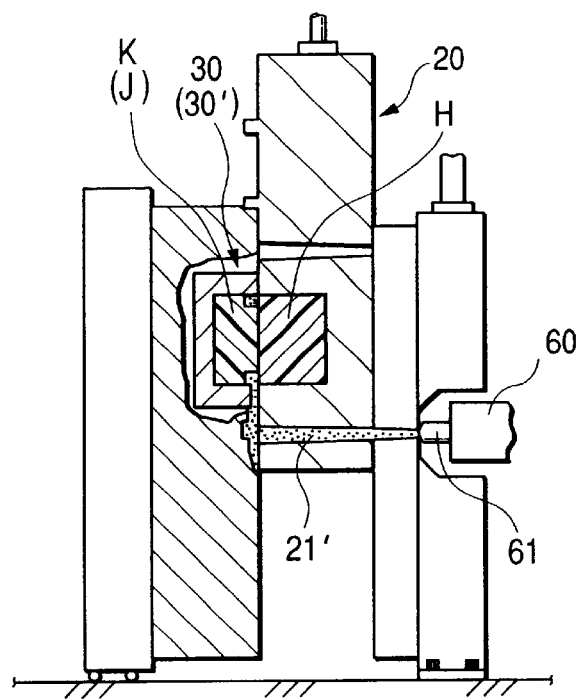
FIGS. 4A and 4B are partly sectional views typically showing a molding step according to the embodiment of the present invention in conjunction with the mold assembly.
Figure 4B:
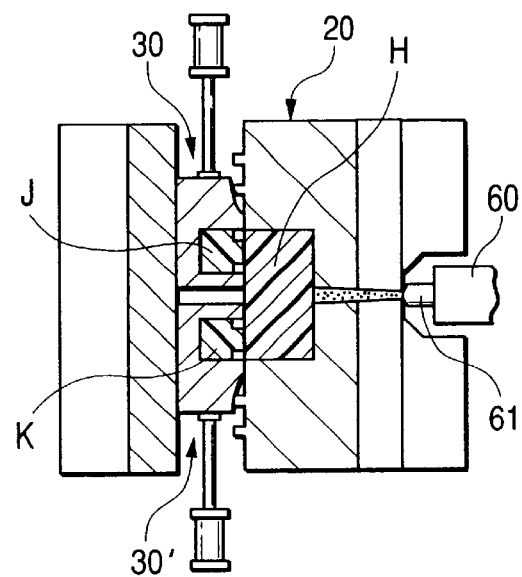

In this state, mold clamping is performed. As a result, circumferential grooves are formed by the cut step portions j and k in circumferential portions respectively in which the second and third semi-molded products J and K in the molded product S are in contact with the first semi-molded product H. A molten resin is ejected from the nozzle 61 of the injection unit 60. The circumferential grooves formed by the cut step portions j and k are filled with the molten resin from the second sprue 21' of the slide mold 20 through the runner 42 and the gate 43 of the movable mold 40. As a result, the first, second and third semi-molded products H, J and K are integrated with one another. FIGS. 4A and 4B show a state in which the semi-molded products are integrated in the step of secondary molding.

Figure 5:
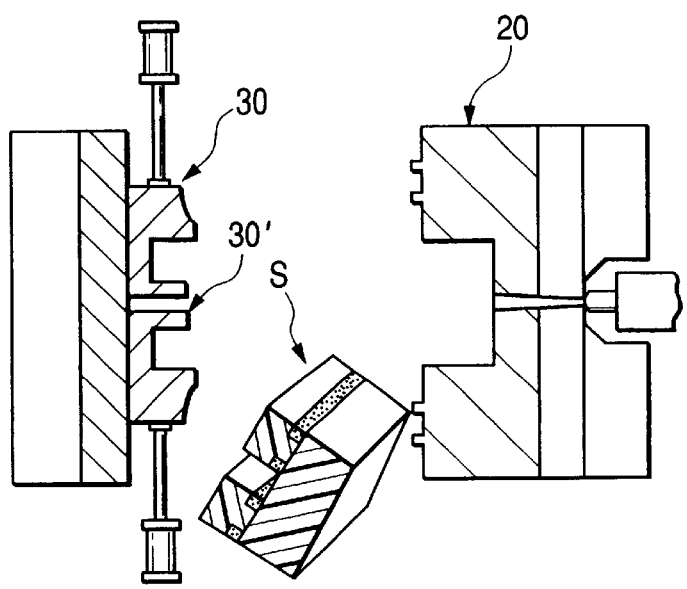
FIG. 5 is a partly sectional view typically showing a molding step according to the embodiment of the present invention in conjunction with the mold assembly and is a plan view showing a state in which a movable mold is opened so that a molded product is taken out.
Figure 6A:
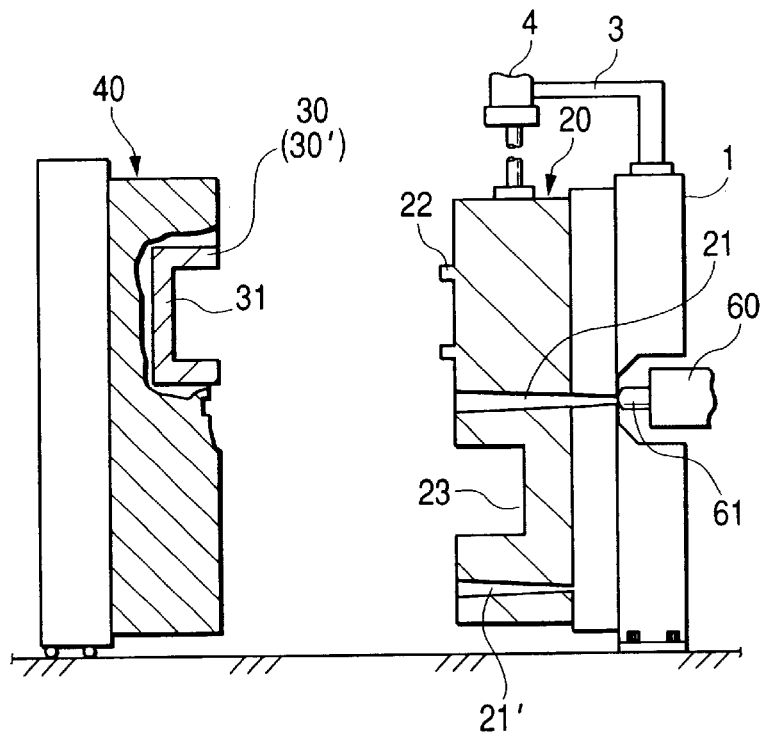
FIGS. 6A and 6B are partly sectional views typically showing a state in which the mold assembly according to the embodiment of the present invention is opened in a position of primary molding.
Figure 6B:
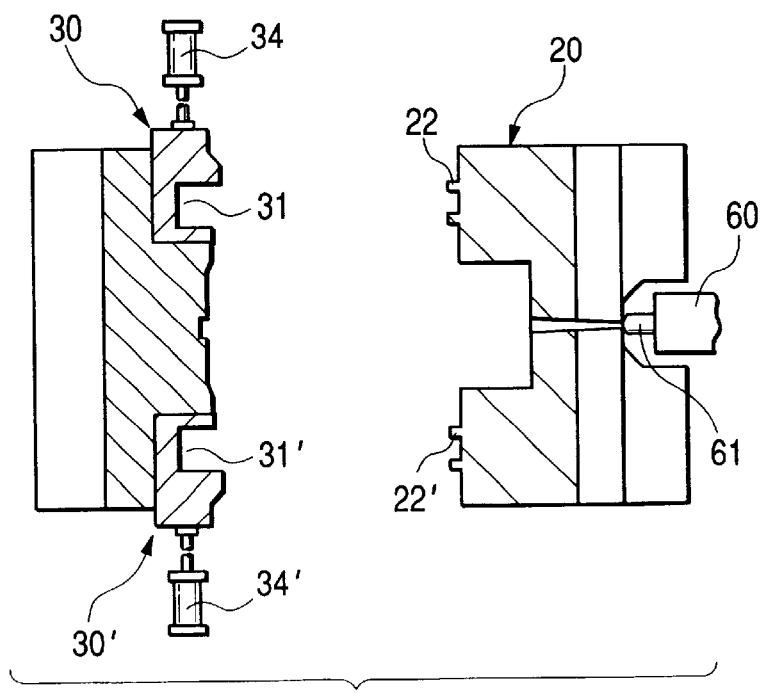

After cooling and solidification of the molten resin, the movable mold 40 is opened. As a result, the ejector pin protrudes so that the molded product S is ejected as shown in FIG. 5. In the condition that the molded product S is taken out and the movable mold 40 is opened, the slide mold 20 is slid downward. On the other hand, the slide cores 30 and 30' are also slid so as to be separated from each other. As a result, the mold assembly returns to a primary molding-enabled state as shown in FIGS. 6A and 6B. Hereafter, the aforementioned procedure is repeated to obtain the molded product S.

It is obvious that the present invention is not limited to the aforementioned embodiment but can be carried out variously. That is, it is obvious that the shape of the molded product S and the number of semi-molded products H, J and K are not limited to the embodiment shown in FIGS. 7A and 7B. For example, each of the second and third semi-molded products J and K may be formed as a semi-hollow part opened to one direction in the step of primary molding and then the opening portions thereof may be fusion-bonded to the first semi-molded product H in the step of secondary molding so that a hollow molded product can be formed. Further, a step portion for bonding may be provided also in the first semi-molded product H to improve bonding strength. In addition, a bonding resin may be ejected from another injection unit at the time of secondary molding.

Although the aforementioned embodiment has shown the case where a pair of slide cores 30 and 30' are provided so as to be driven to slide, the present invention may be applied also to the case where only one slide core is configured so as to slide relative to the other stationary core. In this case, the other core may serve as a movable mold. It is further obvious that a plurality of cavities may be provided in each of the slide mold 20 and the slide cores 30 and 30'.

As described above, in the method according to the present invention, primary molding is performed so that a plurality of semi-molded products are formed in a first mold simultaneously, then a second mold is opened in a condition that the semi-molded products remain in the first mold, and the first mold is moved to collect the semi-molded products into a predetermined position; and then secondary molding is performed so that a molten resin is injected into contact portions of the semi-molded products which are collected and clamped to come into contact with one another to thereby integrate the plurality of semi-molded products with one another in the first mold. Accordingly, a complex molded product can be formed. Furthermore, the complex molded product can be formed in the mold assembly by the two steps of primary molding and secondary molding which are the same in kind. Accordingly, the present invention has a special effect that a high-quality molded product can be obtained inexpensively. Further, another aspect of the invention is configured so that a molten resin different from the resin used at the time of primary molding is injected at the time of secondary molding. Accordingly, the strength of the joint portions can be improved by selection of the resin. Furthermore, the effect on the design can be improved by use of a colored resin.

What is claimed is:

1. A method of forming a molded product from three or more semi-molded products, comprising the steps of:

primary molding a plurality of semi-molded products in a first mold simultaneously, then a second mold being opened in a condition that said semi-molded products remain in said first mold;

moving said first mold so as to collect said semi-molded products into a predetermined position in which they are clamped together; and secondary molding a molten resin which is injected into contact portions of said semi-molded products, so that said plurality of semi-molded products are integrated with one another in said first mold to thereby obtain a molded product, wherein said first mold is defined by a slide mold to be slid relative to a stationary mold and slide cores to be slid in a direction different from the sliding direction of said slide mold.

2. A method of forming a molded product from three or more semi-molded products according to claim 1, wherein a molten resin different from said resin used at the time of primary molding is injected at the time of secondary molding.

3. A mold assembly for forming a molded product from three or more semi-molded products, comprising:

a slide mold provided with a predetermined number of cavities; and slide cores each provided with a predetermined number of cavities, wherein said slide cores is arranged so as to be slidable in a direction different from the sliding direction of said slide mold, and said slide mold and said slide cores are arranged so as to be slidable between a position where said cavities of said slide mold are located separately from said cavities of said slide cores on one hand and another position where said cavities of said slide mold are located so as to approach said cavities of said slide cores to match therewith on the other hand.

4. A mold assembly for forming a molded product from three or more semi-molded products according to claim 3, wherein said slide cores are constituted by a pair of slide cores which are configured so as to be slidable in a direction perpendicular to the sliding direction of said slide mold.

5. A method of forming a molded product from three or more semi-molded products according to claim 1, wherein said step of moving said first mold includes moving first and second semi-molded products of said plurality of semi-molded products in a first direction so as to approach each other, and moving a third semi-molded product of said plurality of semi-molded products in a second direction so as to approach said first and second semi-molded products, wherein said first direction and second directions are perpendicular to each other.

6. A method of forming a molded product from three or more semi-molded products according to claim 5, wherein said first direction is a horizontal direction and said second direction is a vertical direction.

* * * * *